United States Patent

[11] 3,619,133

| [72] | Inventors | Kozo Fukuba<br>Niihama;<br>Reiji Matsuda, Niihama; Syozo Fujioka,<br>Shuso-Gun, Ehime-ken; Yasutomo Ogushi,<br>Niihama; Shigeru Nishibara, Niihama, all<br>of Japan |
|------|-----------|---|
| [21] | Appl. No. | 779,373 |
| [22] | Filed | Nov. 27, 1968 |
| [45] | Patented | Nov. 9, 1971 |
| [73] | Assignee | Sumitomo Chemical Co., Ltd. |
| [32] | Priority | Dec. 6, 1967 |
| [33] | | Japan |
| [31] | | 78572 |

[54] METHOD FOR PREPARING SODIUM AMMONIUM HYDROGEN PHOSPHATE
2 Claims, 2 Drawing Figs.

[52] U.S. Cl................................................. 23/107,
23/106, 23/302, 23/100
[51] Int. Cl........................................................C01b 25/26,
C01b 25/28

[50] Field of Search............................................. 23/106,
107, 302, 100

[56] References Cited
UNITED STATES PATENTS

| 1,859,835 | 5/1932 | Mitteau.......................... | 23/107 |
| 1,929,002 | 10/1933 | Mitteau.......................... | 23/107 X |
| 2,623,814 | 12/1952 | Gray............................... | 23/301 |
| 2,671,716 | 3/1954 | Ayers............................. | 23/295 |
| 3,458,279 | 7/1969 | Yatsutake et al............. | 23/106 |

*Primary Examiner*—Oscar R. Vertiz
*Assistant Examiner*—Gregory A. Heller
*Attorney*—Wenderoth, Lind & Ponack ABSTRACT: This invention relates to a process for producing sodium ammonium hydrogenphosphate ($NaNH_4HPO_4 \cdot 4H_2O$) of a high purity and ammonium chloride or an ammonium chloride-containing solution from phosphoric acid, ammonia and sodium chloride or ammonium phosphate and sodium chloride.

INVENTORS
KOZO FUKUBA
REIJI MATSUDA
SYOZO FUJIOKA
YASUTOMO OGUSHI
SHIGERU NISHIBARA

BY *Wenderoth, Lind & Ponack*
ATTORNEYS

METHOD FOR PREPARING SODIUM AMMONIUM HYDROGEN PHOSPHATE

There is a known process for producing sodium ammonium hydrogen phosphate by reacting phosphoric acid, ammonia and a soda alkali such as soda ash (or caustic soda) and then cooling the solution to crystallize the phosphate. For example, in Japanese Pat. publication No. 13,487/1965, there is proposed a process for producing sodium ammonium hydrogen phosphate, characterized by reacting wet process phosphoric acid and ammonia, adjusting the pH thereof to 3.6 to 6.0, separating part or most of an impurity precipitate deposited while the reaction mixture is kept above a temperature at which ammonium phosphate crystallizes, then adding a soda alkali as soda ash or caustic soda to the solution containing the remaining impurities, then cooling the mixture to crystallize sodium ammonium hydrogen phosphate crystals of a granularity large than that of the impurity precipitate, separating the crystallized sodium ammonium hydrogen phosphate from the impurity particles by filtering the slurry thereby obtaining high purity sodium ammonium hydrogen phosphate crystals. This is a process for obtaining a high purity sodium ammonium hydrogen phosphate by effectively and properly separating impurities contained in wet phosphoric acid employed as the starting material.

One object of the present invention is to provide a more economical process compared with the known processes, for producing sodium ammonium hydrogen phosphate.

Another object of the present invention will be apparent from the following descriptions.

The present inventors found that these and other objects can be accomplished by providing a process for producing sodium ammonium hydrogen phosphate with the byproduction of ammonium chloride which comprises dissolving, in a aqueous system, at or near the boiling temperature, materials consisting mainly of phosphoric acid, ammonia and sodium chloride or ammonium phosphate and sodium chloride at a mol ratio of $H_3PO_4:NH_3:NaCl$ of $1:1.5 -2.7:0.8-2.5$, separating precipitated impurities at a temperature higher than the temperature at which sodium ammonium hydrogen phosphate precipitates, cooling the solution below 50° C., preferably 30° to 10° C., separating the formed sodium ammonium hydrogen phosphate crystals, which crystals are washed and died.

The mother liquor, after the separation of the phosphate crystals is concentrated and ammonium chloride crystals are formed at a temperature higher than the temperature at which sodium ammonium hydrogen phosphate crystallizes, and the crystals are separated.

As a result of investigation on a process for producing the phosphate, the present inventors have developed a more economical process when compared with the known processes. Such process is characterized by using the cheapest industrial salt as the soda and which gives as a byproduct, ammonium chloride which is employable as a raw material for fertilizers. The new process is based on the study on the solubility equilibrium of a $Na-NH_4-P_2O_5-Cl-H_2O$ system. As regards the solubility equilibrium of the $Na-NH_4-P_2O_5-Cl-H_2O$ system, it is mentioned by R. Lauffenburger and M. Broadsky in Compt. rend. 206, 1383 –1385 (1938) that the points where three salts are present as a solid phase and some others were measured. However, nothing else nor any detail has been disclosed. Therefore, the inventors have measured the solubility in detail to make the solubility equilibrium of an $Na-NH_4-P_2O_5-Cl-H_2O$ system and have utilized the diagram to investigate the conditions for producing the phosphate and ammonium chloride.

The invention will be explained in more detail by referring to the accompanying drawings wherein.

Figure 1:
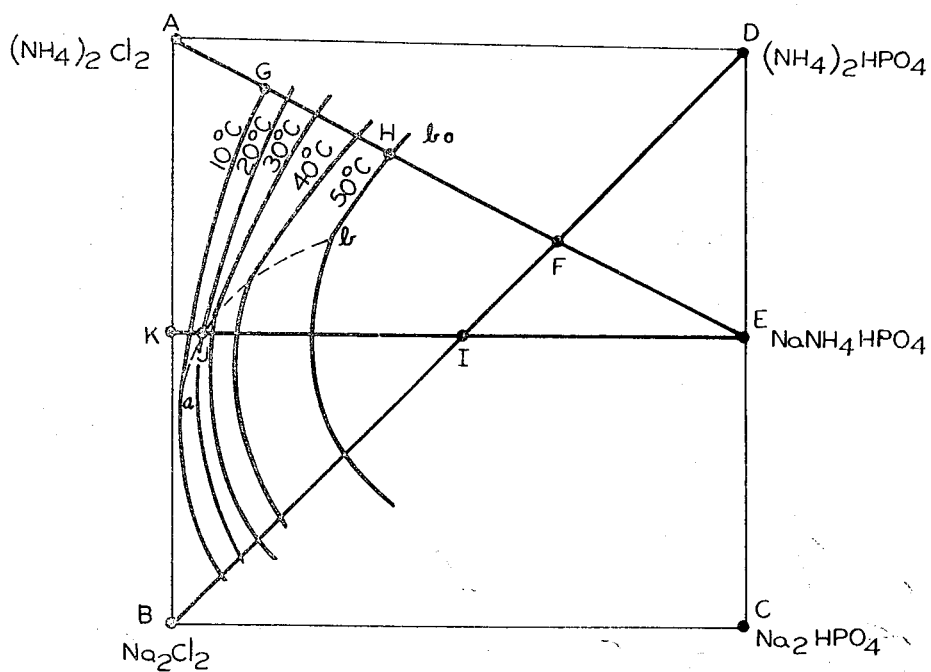
FIG. 1 is a plan view of a solubility equilibrium diagram of an $Na-NH_4-P_2O_5-Cl-H_2O$ system.
Figure 2:
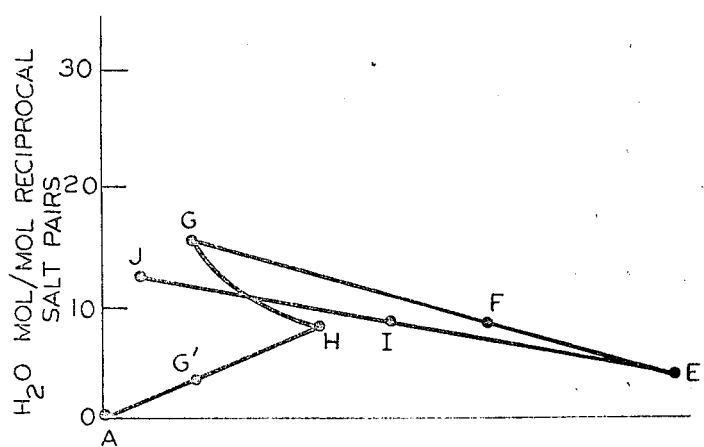
FIG. 2 is an elevation of the solubility equilibrium diagram of the $Na-NH_4-P_2O_5-Cl-H_2O$ system.

In indicating the solubility equilibrium diagram, according to Janeck's tetragonal prism coordinates, each of $(NH_4)_2HPO_4$, $Na_2HPO_4$, $Na_2Cl_2$ and $(NH_4)_2Cl_2$ as reciprocal salt pairs are arranged at the apices of the square so that common radical is adjacent to each other, the anhydride is two-dimensionally shown within the square by the number of mols of the radical per mol of the reciprocal pair salt and water is shown by taking the number of mols per mol of the anhydride at the point of the vertical direction from the point of the anhydride. The results of the measurements are shown in FIG. 1 and FIG. 2. In the drawings, the bold lines represent the compositions of the saturated solution in which 2 salts coexist as the solid phase at the respective temperatures of 10° 20° 30° 40° and 50° C. For example, it is shown that, in the liquid composition on the apex A side of the line $a—a_0$, the solid phase is ammonium chloride and, in the liquid composition on the other side, the bottom substance is sodium ammonium hydrogen phosphate. The dotted line $a–b$ represents the composition of the saturated solution at each temperature in which the three salts of ammonium chloride, sodium chloride and sodium ammonium hydrogenphosphate coexist.

The conditions for producing the phosphate and ammonium chloride may be investigated by referring to this equilibrium state diagram.

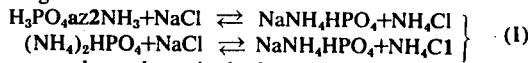

For example, as shown in the formula (1), in the case where a mixture of phosphoric acid, ammonia and sodium chloride at a mol ratio of 1:2:1 or diammonium hydrogen phosphate and sodium chloride at a mol ratio of 1:1 are dissolved and the mixtures are then cooled to 10° C. to crystallize sodium ammonium hydrogen phosphate, the salt composition of the raw material fed is represented by the intersection point F of the line segments BD and AE. The composition of the mother liquor moves gradually towards the direction of FA as the phosphate is crystallized by cooling and reaches the point G on the boundary line at 10° C. The amount of the crystallized phosphate per mol of the mixture of the raw materials is given by $\overline{FG}/\overline{EG}$ mols. The yield of the sodium ammonium hydrogen phosphate is given by the following equation.

$$\frac{\overline{FG}}{\overline{AF}\cdot\overline{EG}} \times 100 = \frac{0.509}{0.667 \times 0.842} \times 100 = 90.5 \ (\%)$$

Each figure in the equation is the found one.

The water content in the mixture of the raw materials required to work the above particular process is represented by F in FIG. 2, and the water content of the mother liquor after crystallization of the phosphate is represented by G in the same diagram.

Further, at a temperature higher than the sodium ammonium hydrogen phosphate crystallizing temperature, the point G belongs to the ammonium chloride region where only ammonium chloride can be crystallized. For example, if after the phosphate is crystallized out, the mother liquor is heated to evaporate the water contained therein from G to G' (FIG. 2) and is then cooled to 50° C., pure ammonium chloride is crystallized out, the composition of mother liquor moves to the direction of GE and reaches a point H on the boundary line. The yield of ammonium chloride is as follows:

$$\frac{\overline{GH}}{\overline{EG}\cdot\overline{AH}} \times 100 = \frac{0.225}{0.842 \times 0.383} \times 100 = 69.7 \ (\%)$$

Each figure in the equation is the found one.

The salt composition of the raw materials need not be limited to the quantitative relation shown in the formula (1). That is, the mol ratio of phosphoric acid, ammonia and sodium chloride need not be limited to 1:2:1.

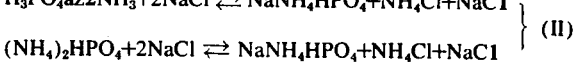

For example, as shown by the formula (II), in case where a mixture of phosphoric acid, ammonia and sodium chloride at a mol ratio of 1:2:2: or diammonium hydrogen phosphate and sodium chloride at a mol ratio of 1:2 is dissolved and then cooled to 20° C. to crystallize sodium ammonium hydrogen phosphate, the salt composition of the raw materials fed is shown by the point I, and the composition of the mother liquor moves to the direction of IK as the phosphate is crystallized and reaches a point J at which the three components of ammonium chloride, sodium chloride and sodium ammonium hydrogen phosphate coexist as a solid phase at 20° C. The water content in the mixture of the raw materials required to work this process is represented by I in FIG. 2 and the water content of the mother liquor after crystallization of the phosphate is represented by J in the same diagram. The yield of the sodium ammonium hydrogen phosphate is given by the following equation.

$$\frac{IJ}{IK.EJ} \times 100 = \frac{0.45}{0.5 \times 0.95} \times 100 = 94.5 \ (\%)$$

Each figure in the equation is the found one. Thus a very high yield will be obtained even without recycling.

The present invention is based on the results of the study of the solubility equilibrium diagram of Na—$NH_4$—$P_2O_5$—Cl—$H_2O$ system mentioned above.

In carrying out the present invention, the aqueous solution substantially of phosphoric acid, ammonia and sodium chloride may be obtained usually by mixing ammonia and sodium chloride with a phosphoric acid obtained by a wet or furnace process, or mixing sodium chloride with solid ammonium phosphate in the form of an aqueous solution at or near the boiling temperature, usually at 70° to 150° C. The solution resulting from the washing of sodium ammonium hydrogen phosphate crystals or ammonium chloride crystals, or the mother liquor after the separation of ammonium chloride crystals may be added, if desired. In the case of using wet process phosphoric acid as the phosphoric acid, in order to more effectively separate precipitative impurities contained therein, it is preferable to employ a process wherein firstly, ammonia is introduced to the phosphoric acid at a mol ratio of $NH_3/H_3PO_4$ of more than 1, and thereafter the impurity precipitate is separated and secondly, a sufficient amount of ammonia and sodium chloride are added and mixed. Alternatively, firstly, ammonia is added to the phosphoric acid while also adding a part o all of sodium chloride thereto, and thereafter the impurity precipitate is separated and secondly, the sufficient amount of ammonia and/or sodium chloride is added. Any industrial salts may be used for the sodium chloride, and the mol ratio of $H_3PO_4$:$NH_3$:NaCl in the resulting solution is kept at 1:1.5–2.5. Particularly, the adjustment of the mol ratio of sodium chloride to phosphoric acid is important. In case where the mol ratio of sodium chloride to phosphoric acid is smaller than in the above range, the yield of the phosphate will be reduced. In case where it is larger than in the above range, not only the yield of the phosphate will be reduced but also its purity will deteriorate. Further, the amount of ammonia is kept at a mol ratio of $NH_3/H_3PO_4$ of 1.5–2.7 per mol of phosphoric acid. In case where the mol ratio of ammonia to phosphoric acid is smaller than in this range, the yield of the phosphate will be remarkably reduced. In case where it is larger than in the above-specified range, the ammonia content in the mother liquor after the separation of the phosphate will become so high as to require further recovery equipment. In the case of using industrial sodium chloride salt containing impurities, it is recommended to add it simultaneously with ammonia and to remove the impurities together with the impurities in the phosphoric acid.

Further, in producing the phosphate by using sodium chloride, and monoammonium phosphate as the starting materials, ammonia is further added into a solution of monoammonium phosphate or a solution of monoammonium phosphate and sodium chloride. For the ammonium phosphate, there may be used any of monoammonium phosphate, diammonium hydrogen phosphate and a mixture thereof. However, the additional amount of ammonia may be varied depending on the concentration of ammonia desired in the resulting solution and, in case where only diammonium hydrogen phosphate is used, further addition of ammonia is not required substantially or a very small amount of it may be added.

In preparing a solution consisting substantially of phosphoric acid, ammonia and sodium chloride, when phosphoric acid, ammonia and sodium chloride are employed as the raw materials, the neutralization heat of ammonia is effectively utilized for the preparation of the solution. But, in such case where no neutralization heat by ammonia can be effectively utilized as in the case of using the ammonium phosphate and sodium chloride, some external heating may be necessary. The precipitated impurities from the wet process phosphoric acid and soda source may be properly separated after the completion of the reaction or during the process of preparing the solution at the temperature suitable for separating them. The impurities may be separated in a suitable manner such as filtration, centrifugal settlement or static settlement. These separated impurities may be utilized as raw materials for fertilizers as such or after recovering water-soluble phosphoric acid and ammonia contained therein by water washing.

In separating sodium ammonium hydrogen phosphate and ammonium chloride from the thus prepared solution, the following method may be used. When this solution is first cooled to be below 30° C. or preferably at 30° to 10° C., sodium ammonium hydrogen phosphate is firstly crystallized out. These crystals may be separated in a suitable manner as mentioned above. If the temperature is higher than 50° C., the yield of sodium ammonium hydrogen phosphate is reduced. Further, in case where the solution is cooled to be below 10° C., the solution has to be diluted and the amount of coolant required is increased, which is not economical.

The separated phosphate crystals are washed with a small amount of water and then dried. The resulting phosphate crystals do not substantially contain such impurities as iron, aluminum, magnesium, chlorine, fluorine and silicon and are very high in purity.

The mother liquor is usually concentrated by heating, and then ammonium chloride are crystallized at a temperature (preferably above 30° C.) higher than the temperature at which sodium ammonium hydrogen phosphate is crystallized out. The ammonium chloride crystals are separated and dried as such or after they are water washed. As only a slight amount of phosphoric acid is contained in the ammonium chloride crystals and almost all amount of the phosphoric acid remains in the mother liquor, the mother liquor after the separation of ammonium chloride may be recycled to the raw material system. Thus, repeat of the alternate crystallization of sodium ammonium hydrogen phosphate and ammonium chloride and recycling the mother liquor to the raw material system make it possible to recover almost all of the phosphoric acid and ammonia and/or ammonium phosphate and sodium chloride as sodium ammonium hydrogen phosphate and ammonium chloride.

If desired, the solution after the separation of sodium ammonium hydrogen phosphate crystals may be used as such or after the further separation of ammonium chloride, as a raw material for a liquid or solid compound fertilizer.

The present invention will be explained more concretely in the following with reference to the examples to which the invention is not limited and in which percent is by weight unless otherwise specified.

EXAMPLE 1

1000 g. of wet process phosphoric acid (29.55 percent $P_2O_5$, 3.60 percent $SO_3$, 0.75 percent $Fe_2O_3$, 0.46 percent $Al_2O_3$ 0.31 percent $MgO$, 0.14 percent $CaO$, 2.02 percent F and 0.99 percent $SiO_2$) were neutralized, while boiling, with gaseous ammonia blown in until the mol ratio of $NH_3/H_3PO_4$ became 1.5. The impurity precipitated in the resulting solution was centrifugally separated at existing temperature conditions. The separated impurities were water washed and water-soluble phosphoric acid and ammonia were recovered and were returned into the mother liquor. While the resulting mother liquor (240 g.) was being neutralized further with gaseous ammonia blown in until the mol ratio of $NH_3/H_3PO_4$ became about 2.3, there were added and dissolved 223 g. of table salt.

Then the solution was cooled to 25° C. The formed sodium ammonium hydrogen phosphate crystals were separated by filtration, washed and then air-dried to obtain 629 g. of dry crystals. The analysis of the sodium ammonium hydrogen phosphate crystals was as follows:

8.05 percent $NH_3$, 14.51 percent $Na_2O$, 33.45 percent $P_2O_5$, 0.07 percent Cl, 0.08 percent $SO_3$, 0.006 percent $Fe_2O_3$, 0.005 percent $Al_2O_3$, 0.003 percent MgO, 0.01 percent CaO, 0.09 percent F and 0.01 percent $SiO_2$.

The mother liquor after the separation of sodium ammonium hydrogen phosphate crystals, having the following analysis composition was used as a raw material for compound fertilizers:

8.49 percent $NH_3$, 2.31 percent $Na_2O$, 4.99 percent $P_2O_5$, 12.42 percent Cl, 2.28 percent $SO_3$, 0.04 percent $Fe_2O_3$, 0.10 percent $Al_2O_3$, 0.013 percent MgO, 0.04 percent CaO, 1.13 percent F and 0.49 percent $SiO_2$.

EXAMPLE 2

153 g. of monoammonium phosphate were dissolved in 575 g. of water, and 155 g. of table salt were added thereto while blowing in 22.5 g. of gaseous ammonia. The solution was then cooled to 25° C. and the sodium ammonium hydrogen phosphate crystals were separated by filtration, water washed and then air-dried to obtain 237 g. of the dry crystals.

The analytical values of the ammonium hydrogen phosphate product and mother liquor (including the solution resulting from the washing of the sodium ammonium hydrogen phosphate crystals) were as follows:

|  | $NH_3$ | $Na_2O$ | $P_2O_5$ | Cl |
|---|---|---|---|---|
| Sodium ammonium hydrogen phosphate (%) | 8.14 | 14.72 | 33.95 | 0.05 |
| Mother liquor (%) | 3.38 | 6.50 | 1.64 | 13.20 |

The mother liquor was used as a raw material for solid compound fertilizers.

EXAMPLE 3

75 g. of table salt and 530 g. of 28 percent aqueous ammonia were added to 1,000 g. of wet process phosphoric acid (30.17 percent $P_2O_5$, 3.52 percent $SO_3$, 0.63 percent $Fe_2O_3$, 0.48 percent $Al_2O_3$, 0.57 percent MgO, 0.16 percent CaO, 1.98 percent F and 1.06 percent $SiO_2$) and the impurity precipitate was separated by filtration at existing temperature conditions. The separated impurities were water washed to recover water-soluble phosphoric acid and ammonia. The washing solution was added into the mother liquor. Then 385 g. of table salt were mixed and dissolved into the resulting mother liquor (1,730 g.). Then the solution was cooled to 10° C. The formed sodium ammonium hydrogen phosphate crystals were separated by filtration, water washed and then air-dried to obtain 712 g. of sodium ammonium hydrogen phosphate crystals. The analysis values of the product and mother liquor (mixed with the washing solution resulted from the washing of the sodium ammonium hydrogen phosphate crystals) were as follows:

|  | Sodium ammonium hydrogenphosphate | Mother liquor |
|---|---|---|
| $NH_3$ | 8.12% | 5.71% |
| $Na_2O$ | 14.79 | 8.06 |
| $P_2O_5$ | 34.0 | 1.82 |
| Cl | 0.08 | 17.23 |
| $SO_3$ | 0.06 | 1.55 |
| $Fe_2O_3$ | 0.002 | 0.017 |
| $Al_2O_3$ | 0.002 | 0.047 |
| MgO | <0.001 | 0.004 |
| CaO | 0.01 | 0.017 |
| F | 0.001 | 0.28 |
| $SiO_2$ | <0.001 | 0.01 |

The mother liquor as such was used as a raw material for compound fertilizers.

EXAMPLE 4

780 g. of the later described solution resulting from the washing of sodium ammonium hydrogen phosphate and 880 g. of the mother liquor after the separation of ammonium chloride crystals were mixed into a solution obtained by dissolving 880 g. of powdery diammonium hydrogen phosphate in 1,380 g. of water and at the same time 390 g. of table salt were added thereto. The mixture was heated at a temperature of about 80° C. Then the solution was cooled to 10° C. The formed sodium ammonium hydrogen phosphate crystals were separated by filtration, water washed and then air-dried to obtain 1,392 g. of dry crystals of sodium ammonium hydrogen phosphate. The first 200 g. of the washing solution were mixed into the mother liquor and 785 g. of the rest were recycled to be used in the raw material system of the next cycle. The analysis of the sodium ammonium hydrogen phosphate and mother liquor was as follows:

|  | $NH_3$ (%) | $Na_2O$ (%) | $P_2O_5$ (%) | Cl (%) |
|---|---|---|---|---|
| Sodium ammonium hydrogenphosphate | 8.10 | 14.75 | 33.92 | 0.03 |
| Mother liquor | 7.29 | 1.32 | 3.05 | 13.70 |

Then 2,830 g. of the mother liquor with the addition of 270 g. of the washing solution obtained by washing the latter described ammonium chloride crystals were heated to obtain 1,330 g. of a concentrate. The concentrate was cooled to 50° C. The formed ammonium chloride crystals were separated by filtration, water washed and then dried to obtain 356 g. of ammonium chloride crystals. The first 65 g. of the washing solution obtained by washing ammonium chloride crystals were mixed into the mother liquor after the separation of ammonium chloride and were returned to be used in the solution before the separation of sodium ammonium hydrogen phosphate crystals in the next cycle and at the same time 265 g. of the rest of the washing solution were mixed in to be used in the ammonium chloride crystallizing step of the next cycle. The analysis of the ammonium chloride crystals and the mother liquor (mixed with a part of the washing solution of ammonium chloride) after the separation of ammonium chloride was as follows:

|  | $NH_3$ (%) | $Na_2O$ (%) | $P_2O_5$ (%) | Cl (%) |
|---|---|---|---|---|
| Ammonium chloride | 31.5 | 0.05 | 0.08 | 66.4 |
| Mother liquor | 10.23 | 4.20 | 9.68 | 17.20 |

EXAMPLE 5

1.87 kg. of industrial salt (49.9 percent $Na_2O$, 57.2 percent Cl, 0.47 percent $SO_3$, 0.09 percent CaO and 0.31 percent MgO) were added to a mixture of 3.85 kg. of the mother liquor (11.0 percent $NH_3$, 4.15 percent $Na_2O$, 10.35 percent $P_2O_5$, 15.1 percent Cl, 4.02 percent $SO_3$, 0.92 percent F, 0.18 percent $Fe_2O_3$, 0.04 percent $Al_2O_3$, 0.04 percent CaO, 0.08 percent MgO and 0.16 percent $SiO_2$) resulting from the separation of ammonium chloride to be explained late and 7.1 kg. of wet phosphoric acid (29.9 percent $P_2O_5$, 2.93 percent $SO_3$, 0.77 percent $Fe_2O_3$, 0.51 percent $Al_2O_3$, 0.18 percent MgO, 0.11 percent CaO, 1.85 percent F and 0.98 percent $SiO_2$). Then gaseous ammonia was blown into the mixture so that the mol ratio ($NH_3/H_3PO_4$) of ammonia to phosphoric acid became 2.2 and the impurity precipitate was separated by filtration. The separated impurities were water washed and water-soluble phosphoric acid and ammonia were recovered and were mixed into the refined solution after the separation of the impurities to obtain 13.5 kg. of a refined solution. Then this refined solution was cooled to 10° C. and the deposited sodium ammonium hydrogen phosphate were separated by filtration, water washed and then air-dried to obtain 5.43 kg. dry crystals of sodium ammonium hydrogen phosphate. The analysis of sodium ammonium hydrogen phosphate was as follows:

8.11 percent $NH_3$, 14.70 percent $Na_2O$, 33.75 percent $P_2O_5$, 0.09 percent Cl, 0.05 percent $SO_3$, 0.001 percent F, 0.002 percent $Fe_2O_3$, 0.002 percent $Al_2O_3$, 0.01 percent CaO, 0.001 percent MgO and 0.002 percent $SiO_2$.

The solution resulted from the water washing of the sodium ammonium hydrogen phosphate was mixed into the mother liquor, the mixture was heated to concentrate to be 5.8 kg. and was then cooled to 50° C. and the crystallized ammonium chloride was centrifugally separated to obtain 1.57 kg. of ammonium chloride crystals.

The analysis of the obtained ammonium chloride crystals and the mother liquor after the separation of ammonium chloride was as follows:

|  | Ammonium chloride | Mother liquor |
| --- | --- | --- |
| $NH_3$ | 29.30% | 11.11% |
| $Na_2O$ | 0.32 | 4.02 |
| $P_2O_5$ | 0.81 | 10.0 |
| Cl | 60.86 | 14.30 |
| $SO_3$ | 0.98 | 5.86 |
| F | 1.75 | 0.76 |
| $Fe_2O_3$ | 0.024 | 0.13 |
| $Al_2O_3$ | 0.0004 | 0.09 |
| CaO | 0.02 | 0.06 |
| MgO | 0.017 | 0.09 |
| $SiO_2$ | 0.35 | 0.18 |

The mother liquor was returned, mixed and used in the raw material system of the next cycle.

What we claim is:

1. A process for producing sodium ammonium hydrogen phosphate ($NaNH_4HPO_4 \cdot 4H_2O$) which comprises dissolving in an aqueous system at or near the boiling temperature the materials consisting essentially of phosphoric acid, ammonia, and sodium chloride or ammonium phosphate and sodium chloride at a mol ratio of $H_3PO_4:NH_3:NaCl$ of 1:1.5–2.7:0.8–2.5, separating the impurities precipitated at a temperature higher than the temperature at which sodium ammonium hydrogen phosphate precipitates, cooling the solution below 50° C., separating the formed sodium ammonium hydrogen phosphate crystals, which are washed and dried.

2. A process as claimed in claim 1 wherein the mother liquor after the separation of the phosphate crystals is concentrated and ammonium chloride crystals are formed at a temperature higher than the temperature at which sodium ammonium hydrogen phosphate crystallizes, and the crystals are separated.

* * * * *